(12) United States Patent
Guo

(10) Patent No.: US 7,370,356 B1
(45) Date of Patent: May 6, 2008

(54) DISTRIBUTED NETWORK MONITORING SYSTEM AND METHOD

(75) Inventor: Yi Guo, Fremont, CA (US)

(73) Assignee: Symantec Corporation, Cupertino, CA (US)

( * ) Notice: Subject to any disclaimer, the term of this patent is extended or adjusted under 35 U.S.C. 154(b) by 661 days.

(21) Appl. No.: 10/350,172

(22) Filed: Jan. 22, 2003

Related U.S. Application Data

(60) Provisional application No. 60/352,076, filed on Jan. 23, 2002.

(51) Int. Cl.
*G06F 11/00* (2006.01)
*H04L 12/28* (2006.01)
*H04L 9/00* (2006.01)
*H04L 1/00* (2006.01)
*H04K 1/00* (2006.01)

(52) U.S. Cl. .................. 726/22; 370/254; 713/153; 713/172; 705/78

(58) Field of Classification Search .............. 713/201, 713/153, 172; 709/224; 726/22; 370/254; 705/78
See application file for complete search history.

(56) References Cited

U.S. PATENT DOCUMENTS

| | | | | |
|---|---|---|---|---|
| 5,185,860 A | * | 2/1993 | Wu | 709/224 |
| 5,414,833 A | * | 5/1995 | Hershey et al. | 726/22 |
| 5,627,766 A | * | 5/1997 | Beaven | 702/122 |
| 5,796,736 A | * | 8/1998 | Suzuki | 370/254 |
| 5,796,942 A | * | 8/1998 | Esbensen | 726/13 |
| 5,805,801 A | * | 9/1998 | Holloway et al. | 726/22 |
| 5,987,611 A | | 11/1999 | Freund | 713/201 |
| 5,991,881 A | * | 11/1999 | Conklin et al. | 726/22 |
| 6,115,393 A | * | 9/2000 | Engel et al. | 370/469 |
| 6,243,756 B1 | * | 6/2001 | Whitmire et al. | 709/232 |
| 6,347,374 B1 | * | 2/2002 | Drake et al. | 726/1 |
| 6,519,581 B1 | * | 2/2003 | Hofmann et al. | 706/47 |
| 6,574,628 B1 | * | 6/2003 | Kahn et al. | 707/10 |
| 6,633,909 B1 | * | 10/2003 | Barrett et al. | 709/224 |
| 6,735,702 B1 | * | 5/2004 | Yavatkar et al. | 726/13 |
| 6,763,469 B1 | * | 7/2004 | Daniely | 726/11 |
| 6,775,657 B1 | * | 8/2004 | Baker | 706/45 |
| 6,801,507 B1 | * | 10/2004 | Humpleman et al. | 370/257 |
| 6,892,227 B1 | * | 5/2005 | Elwell et al. | 709/218 |
| 6,910,135 B1 | * | 6/2005 | Grainger | 726/23 |
| 6,952,421 B1 | * | 10/2005 | Slater | 370/401 |

(Continued)

FOREIGN PATENT DOCUMENTS

EP 1160646 A2 * 12/2001

*Primary Examiner*—Techane J. Gergiso
(74) *Attorney, Agent, or Firm*—Gunnison, McKay & Hodgson, L.L.P.; Serge J. Hodgson

(57) ABSTRACT

Methods and systems for protecting the computer network against unauthorized access are disclosed. Information is reported about each network device connected to the network and/or one or more corresponding users. The reported information is correlated to determine if any unauthorized devices are connected to the network. To report the desired information, each device authorized to use the network may be provided with an agent configured to report information about the device to which it corresponds and information about one or more neighboring devices. A "reporting your neighbor" method may be used wherein each network device report its address and the address of its neighbors may be used to determine if any device is not reporting its address. Alternatively, each agent may report information about its device's physical location, e.g., by global positioning satellite (GPS). A door badge system may be used to provide user location information.

24 Claims, 2 Drawing Sheets

U.S. PATENT DOCUMENTS

| | | |
|---|---|---|
| 6,957,199 B1 * | 10/2005 | Fisher ............................ 705/78 |
| 6,970,183 B1 * | 11/2005 | Monroe ......................... 348/143 |
| 6,981,146 B1 * | 12/2005 | Sheymov ....................... 713/172 |
| 7,024,694 B1 * | 4/2006 | Ko ................................. 726/23 |
| 7,089,303 B2 * | 8/2006 | Sheymov et al. ............. 709/224 |
| 7,089,592 B2 * | 8/2006 | Adjaoute ........................ 726/25 |
| 7,117,264 B2 * | 10/2006 | Becker et al. ................ 709/227 |
| 7,185,109 B2 * | 2/2007 | Conrad et al. ................ 709/242 |
| 2002/0066034 A1 * | 5/2002 | Schlossberg et al. ......... 713/201 |
| 2002/0083343 A1 * | 6/2002 | Crosbie et al. ............... 713/201 |
| 2002/0089434 A1 * | 7/2002 | Ghazarian ..................... 340/988 |
| 2003/0051026 A1 * | 3/2003 | Carter et al. .................. 709/224 |
| 2003/0112764 A1 * | 6/2003 | Gaspard et al. ............... 370/252 |
| 2003/0115303 A1 * | 6/2003 | Marian et al. ................. 709/222 |

\* cited by examiner

US 7,370,356 B1

DISTRIBUTED NETWORK MONITORING SYSTEM AND METHOD

CROSS REFERENCE TO A RELATED APPLICATION

This application claims priority from prior U.S. Provisional Patent Application Ser. No. 60/352,076 filed Jan. 23, 2002, the entire disclosures of which are incorporated herein by reference.

FIELD OF THE INVENTION

The present invention relates generally to computer networks and, more particularly, to methods and systems for regulating access and maintaining security of individual wireless or wired network devices.

BACKGROUND OF THE INVENTION

With the ever-increasing popularity of the Internet, more and more personal computers are connected to larger networks. Recently, Wireless Local Area Networks (WLAN) have been developed that connect computers to a network via one or more Wireless Access Points (WAP) distributed throughout a network site. Devices such as laptop computers, personal digital assistants (PDA's) and even cellular phones may connect to the network via radiofrequency, microwave, or other electromagnetic signals without any physical connection, such as a wire, cable or optical fiber, between the device and the WAP. Such WLANs have a lot advantages over conventional LANs associated with this wireless connectivity feature. For example, a wireless local area network (WLAN) can provide network access in situations where the wires, cables or optical fibers associated with a conventional LAN inhibit the mobility of devices and users. At the same time, this enhanced connectivity brings a new series of network security issues. The biggest concern is that as the traditional barrier of entry to the enterprise is no longer a barrier to the wireless signals. Network administrators are thus extremely worried about what's going on in their LAN due to the connection of wireless devices to an existing LAN. The same concern exists for large enterprise networks as each individual could bring his own network device and connect to the existing local area network (LAN) without the permission of network administrators.

Thus there is a need in the art for methods for regulating access and maintaining security of local area networks (LANs) and corresponding systems for implementing such methods.

SUMMARY

Embodiments of the present invention overcome the disadvantages associated with prior art network monitoring.

According to an embodiment of the invention, a method for protecting the computer network against unauthorized access. The method comprises reporting information about each wireless or wired network device connected to the network and/or one or more corresponding users; and correlating the reported information to determine if any unauthorized network devices are connected to the network. An alert may be triggered if the correlated information indicates that one or more unauthorized network devices are connected to the network. The information may include address information about one or more particular devices, address information about one or more neighboring devices to one or more particular devices, or information about the physical location of one or more devices, information about the physical location of one or more users associated with one or more particular devices.

Other embodiments of the invention may be implemented as a system for protecting the computer network against unauthorized access. The method includes means for reporting information about each network device connected to the network and/or one or more corresponding users; and means for correlating the reported information to determine if any unauthorized network devices are connected to the network.

To report the desired information, each device authorized to use the network may be provided with an agent configured to report information about the device to which it corresponds and information about one or more neighboring devices. Each agent may report address information about the device to which the agent corresponds and address information about one or more neighboring devices. Such address information may be correlated by comparing a list of "self-reported" device addresses to a list of "neighboring" device addresses. According to an embodiment of the present invention, a "reporting your neigbhor" method may be used to let each network device report its address and the addresses of its neighbors. A security program at a central location may correlatively analyze the address information to determine if any device is not reporting its address.

Alternatively, each agent may report information about the physical location of the device corresponding to that agent. Such location information may be provided, e.g., by global positioning satellite (GPS). A door badge system may be used to provide user location information. With the location information, a network administrator or a security program can determine if a user is not inside a building but accessing the network.

The agents may also provide one or more biometric identifiers associated with one or more persons using one or more particular devices. The biometric identifiers provided by the agents may be correlated with stored biometric identifiers associated with known authorized users to determine whether the person using a device is an authorized user.

Embodiments of the above method may be implemented as a program embodied in a computer readable storage medium.

DETAILED DESCRIPTION

Figure 1:
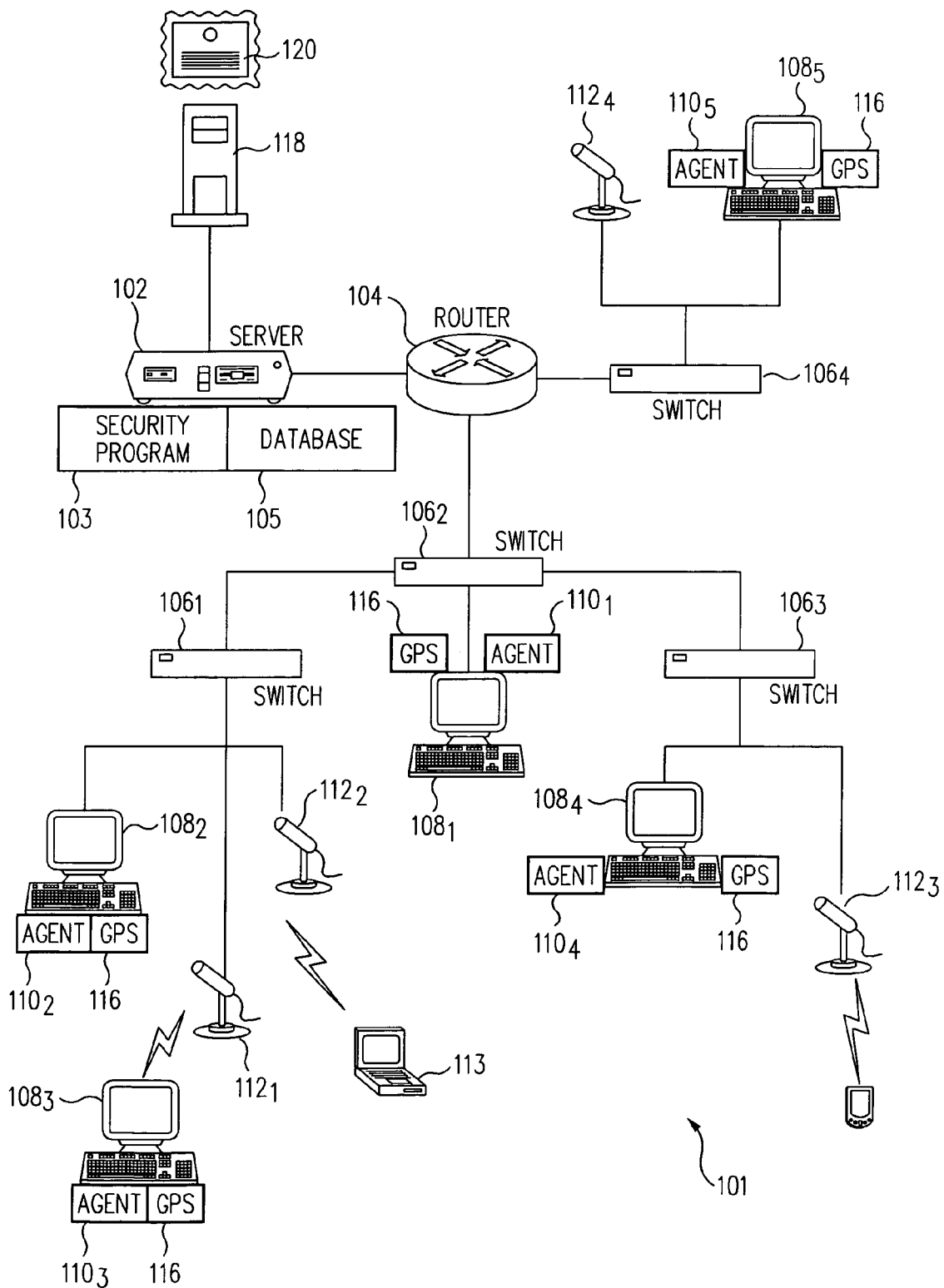
FIG. 1 is a block diagram of a computer network including a system for method for protecting the computer network against unauthorized access according to embodiments of the present invention.

The present invention can be implemented as a security system 101 running on a computer network 100 of the type shown in FIG. 1. The network 100 includes one or more servers 102, routers 104, and switches $106_1$, $106_2$, $106_3$, $106_4$. One or more network devices $108_i$ (e.g., PC's, PDA's etc.) can be connected to the network via each of the switches $106_n$ (n=1,2,3,4). Wireless network devices (e.g., device $108_3$) may connect to the network via access points (AP) including wireless access points (WAP) $112_1$, $112_2$, $112_3$, $112_4$. The elements of the security system 101 include a security program 103 running on the server 102 and one or more agents 110₁, 110₂, 110₃, 110₄, 110₅ running on corresponding network devices 108₁, 108₂, 108₃, 108₄ 108₅ that are authorized to access the network 100. The agents 110$_i$ (i=1,2,3,4,5) may be implemented in either hardware or software or a combination of both.

The server 102 could be a PC operating under the control of a suitable operating system (OS) such as Windows or any other OS. The server 102 may access to one or more databases 105 that store security information, such as a list of parameters that identify authorized AP's, reports from the agents, user information, device location, etc. The server 102 may be a general-purpose computer. Although embodiments of the invention are described herein as being partly implemented in software and executed upon a general purpose computer, those skilled in the art will realize that the invention could be implemented using hardware such as an application specific integrated circuit (ASIC), microcontroller or other hardware circuitry. As such, it should be understood that the invention could be implemented, in whole or in part, in software, hardware or some combination of both. The agents 110$_i$ constantly monitor the existence of devices connected to their respective regions of the network. In a particular embodiment, the agents 110$_i$ may scan for any Wireless Access Point (WAP) connected to their region of the network. The agents 110$_i$ can notify the network administrator if any WAP stops working normally or any unauthorized WAP exists in the surrounding area. The agents 110$_i$ can monitor the wireless traffic from neighboring devices to find out if the wireless device is permitted to send/receive the network traffic. The agents 110$_i$ and server 102 will periodically communicate to each other so that the latest information such as the employee's status of being in or out of the building is available to the module (either server or agent or both) that decides if a specific connection to the network 100 should be permitted. The agents 110$_i$ may periodically report the activities they detect. These reports are useful to further derive the network usage status (e.g., who uses it, when it is used, where the user is when he uses the wireless, etc.). The security program 103 can use these reports to identify the location of a user in real time based on the location of the AP that user is using. The security program 103 may make sure that each agent 110$_i$ is working (based on the periodical report from each agent) and each agent has the latest list of AP that needs to be checked by the agent (e.g., based on the report from the agent that it knows the version number of the list). When the server 102 receives an alert from one or more of the agents 110$_i$, the security program 103 may optionally send commands to the AP for it to disable unauthorized access of a wireless node or other node, it can do so by using methods like updating the WAP's Access Control List (ACL). The affected node may be identified by its MAC address and/or other parameters.

Upon starting, a given agent 110$_i$ will contact the server 102 to see if there is a new AP list and other information (together referred to as a profile) for the agent 110$_i$ to follow. If there is a new profile, the agent will download the profile and store it in local storage on the corresponding device 108$_i$. The agent may then go into the loop to periodically scan the AP. The scan could be done e.g., once every minute. The security program 103 may configure the timing of the scan via the profile. At the end of each scan, the agent 110$_i$ can send the scan results to the server 102 for record keeping and analysis. The agent can also check the scan result and compare it with the AP list from the server 102 and alert the server 102 in the case of a discrepancy. After the scan, the agent may instruct the WLAN NIC for the agent's device to associate with a specific AP (configurable in the profile). When associated with that AP, the WLAN NIC can work in the so-called promiscuous mode. In this mode, the WLAN NIC can "see" all the traffic from all the wireless nodes associated with this WAP.

In one embodiment, among others, the agents 110$_i$ may be in the form of software running on a PC, Cellular phone or PDA or any other form of network device. If the agent 110$_i$ is running on a wireless device, the 802.11B wireless LAN card can be used to scan and listen to the 802.11b traffic. If the network 100 uses other wireless LAN products, the corresponding wireless devices can be used to scan the access points (AP). For example if an 802.11a type WLAN device and AP are used, an 802.11a network interface card (NIC) can scan the AP. To achieve the best result, it is recommended to use all the possible network devices to scan as wide as possible. The security program 103 can send a scan command to the WLAN NIC for it to scan the active access points that connect to the network 100. The details of the scan commands depend on the specific network driver interface specification (NDIS) used by the network 100. By way of example, and without limitation of the invention, one possible set of scan commands, among others, can be found in the Microsoft document about the (NDIS) object OID_802_11_BSSID_LiST_SCAN.

Figure 2:
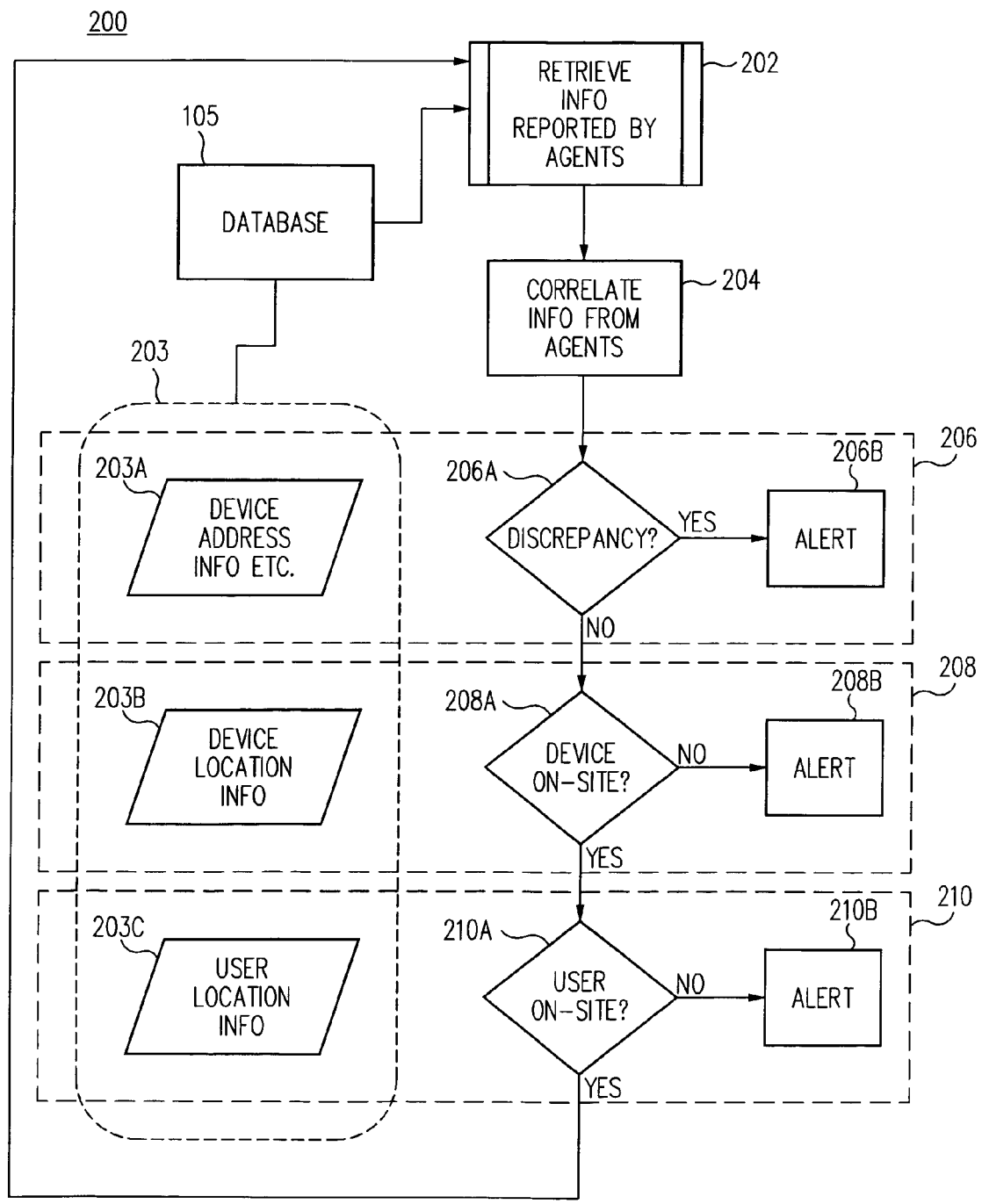
FIG. 2 is a flow diagram of a method for protecting the computer network against unauthorized access according to embodiments of the present invention.

FIG. 2 depicts a flow diagram 200 that illustrates examples of operation of the security program 103. In FIG. 2, thin arrows indicate process flow and thick arrows indicate information flow. Operation of the system 101 may be understood by simultaneously referring to FIG. 1 and FIG. 2. The agents 110$_i$ report information 203 about the devices with which they are associated. The information 203 may be stored, e.g., in the database 105. Examples of such information include device address information 203A, device location information 203B and user location information 203C. At 202 in FIG. 2, the security program 103 retrieves the information 203 reported by the agents 110$_i$. The information is correlated at 204 to determine if any unauthorized devices are connected to the network. Action may be taken as a result of the correlation of information as shown in blocks 206, 208, 210. The type of action taken depends, in part, on the type of information reported. Note that a particular type of information 203A, 203B, 203C is associated with each action block 206, 208, 210.

For example, in the case of device address information 203A, the system 101 may implement a "report your neighbor" method in block 206 as follows. The security program 103 running on the server 102 requires the agent for every device in a particular network neighborhood (e.g., all devices connected to the same switch port or HUB) to report addresses that identify its location and the locations of its neighbors (other devices in the same network neighborhood). All the reports are received at the server 102. The security program 103 running on the server 102 thus obtains a list of addresses for all network devices in that neighborhood (and all other neighborhoods connected to the server 102). Because each device will report its own address and its neighbors' addresses, the server will get the addresses for all the devices in the neighborhood (and/or the whole network 100). Then the security program 103 can process these addresses and match the devices with their addresses and determine if there is a discrepancy at 206A. If there is any reported address having no device claiming to be at that address, the security program 103 could determine that that device doesn't report its address. This means that device has no agent in it. This is something that could be used to trigger alert at 206B.

By way of example, each network device $108_i$ may be identified by a MAC address and an IP address. Any agent $110_i$ can therefore determine the MAC address and IP address for any other network device $108_i$ in its "neighborhood" of the network 100, e.g., those network devices $108_i$ that are connected to the same switch $106_n$. The switches effectively prevent any given network device $108_i$ from identifying other devices $108_i$ connected to the network 100 through different switch ports. For example, network device $108_2$, which is connected to switch $106_2$, cannot identify network device $108_4$, which is connected to switch $106_3$. However, each network device connected to a port of a switch, such as $106_2$ can identify all network devices connected to that port, either directly or indirectly (thru devices like a HUB) and provide the MAC address and IP address to the server 102. It is not strictly necessary to use both the MAC address and the IP address. For example, the security system 101 could work by using, e.g., just the IP address and the AID. Using both, however, will help to reduce ambiguities. Also, by using the sniffing port of a switch, an agent connected to a sniffing port of a switch could "hear" all the traffic going thru that switch, thus, that agent could report more "neighboring" devices.

Embodiments of the present invention may identify one or more malicious devices connected to the network 100. By way of example, agents $110_3$ and $110_2$ may detect the presence of a malicious device 113 connected to the switch $106_1$, e.g., via WAP $112_2$ as follows. Agent $110_3$ sends its IP address and MAC address of network device $108_3$ to the server 102. Since network device $108_3$ resides in the same network neighborhood as network device $108_2$ and malicious device 113, agent $110_3$ can also determine the MAC addresses and IP addresses for these devices and send them to the server 102. In a similar fashion, agent $110_2$ can send its MAC address and IP address to the server 102 along with the MAC and IP addresses for trusted device $108_3$ and malicious device 113. The server 102 can compare the MAC and IP addresses received to see if they belong to a network device reported by an agent running on that device. If any received MAC address and IP address pair is not reported by any agent, the security program 103 can trigger an alert. In this example agents $110_2$ and $110_3$ will report the IP addresses of their corresponding devices, i.e., devices $108_2$, $108_3$. The security program 103 can compile these "self-reported" addresses into a first list. The security program can compile a second list of addresses, which would contain the addresses of "neighboring" devices agents reported by agents $110_2$, $110_3$. In this example, the second list would include the addresses of trusted devices $108_2$, $108_3$, and malicious device 113. A simple comparison of the first and second lists would reveal a discrepancy, i.e., that the address of malicious device 113 is not on both lists, which would trigger an alert. The security program 103 can also trigger an alert if, e.g., the MAC/IP combination is invalid, or if there are other discrepancies, e.g., two different devices with the same MAC and/or IP address. The alert could be in the form of email to admin, send event to a log server such as syslog, generate alert event in Network Management solution such as OpenView or Tivoli.

Some embodiments of the invention, the system 101 may include additional features such as GPS and a door badge system that enhance security, by providing the security program 103 information 203B about the physical location of wireless devices connected to the network 100 through the wireless access points (WAP) $112_j$ (j=1,2,3,4). With the location information, admin or the security program 103 can tell if a user is not inside the physical boundaries of the site, e.g., a building, where the network 100 is installed, but is using the network 100. These features may be implemented, e.g., by installing a global positioning satellite (GPS) device 116 in each network device $108_i$. The GPS device 116 can be part of the agent, e.g., where the agent is implemented in both hardware and software. The GPS device 116 provides information on the location of the network device $108_i$. The corresponding agent $110_i$ obtains the GPS information from the GPS device 116 and sends the GPS information to the server 102. The security program 103 triggers an alarm 208B if at 208A it is determined that the GPS location of the device 108 is not within the boundaries of the site.

With respect to block 210 of FIG. 2, user location information 203C may be obtained using a door badge system. The door badge system may include one or more door badge readers 118 that are connected to the network 100 and a set of door badges 120. Each authorized user of the network 100 receives a door badge 120. The door badges may contain computer readable information, e.g. in the form of magnetic strip, bar code, etc, that identifies the authorized user. The security program 103 may correlate this information with a particular network device $108_i$ to restrict authorized access to the network 100 to situations where both the device $108_i$ and its authorized user are within the boundaries of the site.

Depending on the size of the site where the network 100 is installed and the desired level of security it is possible for the GPS device 116, door badge readers 118, and security program 103 to restrict authorized use of the network 100 to a particular location within the site. The site may be, e.g., a building, a room, floor, wing or other area within a building, particular buildings or other locations within a campus of several buildings, etc. If, e.g., the network 100 is installed in a building, the security program may be configured to authorize the network device $108_i$ to access the network 100 only if both the user and the device are in the building. To enter the building, the user must use his door badge 120 and the door badge reader 118. The security program 103 triggers an alarm 210B if at 210A either the GPS device 116 or the door badge reader 118 indicates that the user is not in the building.

The security program 103 may use any combination of blocks 206, 208, 210 and associated information 203A, 203B, 203C. For example, the security program 103 can use the GPS and door badge information in combination with a "report your neighbor" method as described above to restrict use of the network 100. Even without the use of the "report your neighbor" method, the security system 101 is particularly difficult to defeat since a malicious user must defeat both the GPS device 116 and the door badge reader 118. Furthermore, although the GPS and door badge combination described above is particularly useful for security in wireless networks, embodiments of the present invention are not limited use with such networks.

Additional features may be added to the security system 101 to protect against the theft of an authorized device $108_i$ and/or corresponding door badge 120. For example, the corresponding agent $110_i$ may be configured to provide one or more biometric identifiers associated with the person using the device $108_i$, e.g., fingerprints, retinal scans, or images of the corresponding user's face. The security program 103 may then correlate the biometric identifiers provided by the agent $110_i$ with stored biometric identifiers of one or more known authorized users of the particular device $108_i$ and agent $110_i$. The stored biometric identifiers may be stored in the database 105. The security program 103 may trigger an alert or deny access if the biometric identifiers for the person using the device $108_i$ do not match the stored biometric identifiers. Alternatively, the stored biometric identifiers may be stored by the agent $110_i$, which may perform the correlation itself and deny use of the device $108_i$ if the biometric identifiers for the person using the device $108_i$ do not match the stored biometric identifiers.

In alternative embodiments of the present invention, each agent $110_i$ may optionally identify the corresponding trusted network device $108_i$ by a unique agent identifier (AID) that is reported as part of information 203. The AID is assigned only to trusted network devices $108_i$. The security program 103 key-encrypts the AID for each trusted network device $108_i$. This way each agent $110_i$ may uniquely identify itself to the server 102 and the server may associate a unique AID with each of the trusted network devices $108_i$. However, a given agent $110_i$ cannot determine the AID for any other agent. The security program 103 can then compare the MAC address, IP address and AID provided by each of the agents $110_i$, switches $106_n$, and router 104 to known MAC addresses, IP addresses and AID's for trusted network devices. The security program 103 may identify the malicious device 113 through correlation of the AID information with the reported MAC and IP addresses. Unless the AID/MAC/IP combination for the malicious device 113 matches the MAC address and IP address for a corresponding trusted device, the security program 103 triggers an alarm. For example, the malicious device 113 may not have an agent running on it and, consequently provides no AID (or MAC address or IP address) to the server 102. Such a condition is inconsistent with a trusted device and triggers an alarm as described above. Alternatively, the malicious device 113 may have an agent, but doesn't provide a trusted AID.

The security program 103 can also trigger an alarm if the AID provided by an agent does not correlate to the corresponding MAC and IP addresses for the corresponding network device $108_i$. Furthermore, the security program 103 can also trigger an alarm if two or more devices connected to the network have the same MAC address, IP address, or AID. Thus, even if the malicious device 113 has an agent running on it that provides an AID, MAC address and IP address to the server 102, the malicious device 113 can only defeat the security program 103 if its AID, MAC address and IP address match the corresponding AID, MAC address and IP address for a network device that is not already connected to the network. Although not impossible, such a malicious use is difficult since the security program 103 that generates the AIDs runs on the server 102 and access to the server and the security program can be guarded by other means.

The agents $110_i$ may provide additional forms of information 203 to further ensure that access to the network 100 is authorized. For example, a given agent $110_i$ may provide the current time to the server 102. If the agent $110_i$ is only authorized access to the network during specified hours, attempts to access the network 100 outside of these hours triggers an alarm. Alternatively, the agents $110_i$ may provide the address of access point (AP) that the corresponding device $108_i$ is using to connect to the network 100. If the agent $110_i$ is only authorized to access the network 100 through a specific subset of all the access points on the network, any attempt to connect to the network 100 through an unauthorized access point triggers an alarm.

What is claimed is:

1. In a computer network having a server and a plurality of network devices connected to the server, a method for protecting the computer network against unauthorized access, the method comprising:

providing each authorized device authorized to use the network with an agent configured to report information including:
1) self reported address information about the device to which the agent corresponds;
2) a unique agent identifier (AID) which identifies the device to which the agent corresponds; and
3) neighboring device address information about all neighboring devices connected to a same switch as the device to which the agent corresponds;

reporting the information to a security program on the server; and correlating with the security program the reported information to determine if any unauthorized network devices are connected to the network comprising:

compiling from the self reported address information reported by the agents a first list containing "self reported" addresses;

compiling from the neighboring device address information reported by the agents a second list containing "neighboring" device addresses; and comparing the first list to the second list to determine if there are any discrepancies between the two lists, wherein in the event of a discrepancy, an alert is triggered.

2. The method of claim 1 wherein the information further includes one or more of the following: information about a physical location of one or more devices, or information about a physical location of one or more users associated with one or more particular devices.

3. The method of claim 2, further comprising triggering an alert if the correlated information indicates that one or more unauthorized devices are connected to the network.

4. The method of claim 1 wherein the information includes one or more IP addresses and one or more MAC addresses, one or more IP addresses, or one or more MAC addresses.

5. The method of claim 1 wherein each agent reports information about a physical location of the device corresponding to that agent.

6. The method of claim 5, wherein the information about the physical location includes global positioning satellite (GPS) information.

7. The method of claim 5, further comprising obtaining information about a location of a user associated with the device corresponding to the agent.

8. The method of claim 7, wherein information about the location of the user includes the use of a door badge and door badger reader, wherein the door badge reader is connected to the network.

9. The method of claim 1 wherein each agent provides one or more biometric identifiers associated with a person using the particular device associated with the corresponding agent.

10. The method of claim 9 further comprising correlating the one or more biometric identifiers provided by the agent with one or more stored biometric identifiers associated with one or more known authorized users of the particular device associated with that agent to determine whether the person using the particular device is an authorized user.

11. The method of claim 9 wherein the one or more biometric identifiers include fingerprints, retinal scans, or images of the corresponding user's face.

12. The method of claim 1 wherein the comparing the first list to the second list comprises determining that an address of a device is on the second list but not on the first list.

13. The method of claim 1 wherein, upon determining that an address of a device is on the second list but not on the first list, there is a discrepancy between the first list and the second list.

14. The method of claim 1 wherein, upon determining that a MAC and IP address combination is invalid, there is a discrepancy between the first list and the second list.

15. The method of claim 1 wherein, upon determining that two different devices have the same MAC address, the same IP address, or the same MAC address and IP address, there is a discrepancy between the first list and the second list.

16. The method of claim 1 wherein upon determining that a MAC address, IP address, and unique agent identifier (AID) combination is invalid, an alert is triggered.

17. In a computer network having a server and a plurality of network devices connected to the server, a system for protecting the computer network against unauthorized access, the system comprising:
 means for reporting information comprising an agent provided to each authorized device authorized to use the network configured to report information about the corresponding device including:
  1) self reported address information about the device to which the agent corresponds;
  2) a unique agent identifier (AID) which identifies the device to which the agent corresponds; and
  3) neighboring device address information about all neighboring devices connected to a same switch as the device to which the agent corresponds;
 means for correlating the information to determine if any unauthorized devices are connected to the network, wherein the means for correlating information is configured to:
 compile from the self reported address information reported by the agents a first list containing "self reported" addresses;
 compile from the neighboring device address information reported by the agents a second list containing "neighboring" device addresses; and
 compare the first list to the second list to determine if there are any discrepancies between the two lists, wherein in the event of discrepancy, an alert is triggered.

18. The system of claim 17 wherein the information further includes one or more of the following: information about a physical location of one or more devices, or information about a physical location of one or more users associated with one or more particular devices.

19. The system of claim 17 wherein each agent is configured to report information about a physical location of the device corresponding to that agent.

20. The system of claim 19 wherein the information about the physical location includes global positioning satellite (GPS).

21. The system of claim 19, wherein the means for reporting information includes one or more door badge readers, wherein the door badge reader is connected to the network.

22. The system of claim 17 wherein each agent is configured to provide one or more biometric identifiers associated with a person using the particular device associated with that agent.

23. The system of claim 22 wherein the one or more biometric identifiers include fingerprints, retinal scans, or images of the corresponding user's face.

24. The system of claim 23 wherein the means for correlating the information or the agent is configured to compare the biometric identifier associated with the person using the particular device with one or more stored biometric identifiers associated with the known authorized users of the particular device to determine whether the person using the particular device is an authorized user.

* * * * *